United States Patent [19]
King et al.

[11] Patent Number: 5,188,787
[45] Date of Patent: Feb. 23, 1993

[54] PROCESS FOR THE INJECTION MOULDING OF MULTI-LAYERED ARTICLES

[75] Inventors: David C. King, Bath; Rupert M. Lillis; George White, both of Glenburnie, all of Canada

[73] Assignee: Du Pont Canada Inc., Mississauga, Canada

[21] Appl. No.: 913,961

[22] Filed: Jul. 17, 1992

Related U.S. Application Data

[63] Continuation of Ser. No. 603,277, Oct. 25, 1990, abandoned, which is a continuation-in-part of Ser. No. 299,533, Jan. 19, 1989, abandoned.

[30] Foreign Application Priority Data

Jan. 25, 1988 [GB] United Kingdom ............... 8801599

[51] Int. Cl.$^5$ ...................... B29C 33/14; B29C 45/14; B29C 45/16
[52] U.S. Cl. .................... 264/153; 264/511; 264/550; 264/554; 264/163; 264/255; 264/265; 264/268; 264/292; 264/296; 264/328.1; 264/DIG. 50; 425/111; 425/553; 425/398; 425/292; 220/415
[58] Field of Search ............... 264/163, 153, 246, 229, 264/255, 268, 265, 291, 292, 269, 511, 550, 259, 553, 554, 513, 544, 549, 257, 258, 157, 296, 328.1, 328.11, 328.14, 294, DIG. 50; 425/111, 125, 127, 398, 388, 553, 292; 220/415

[56] References Cited

U.S. PATENT DOCUMENTS

| | | | |
|---|---|---|---|
| 3,321,562 | 5/1967 | Wanderer | 425/398 |
| 3,825,166 | 7/1974 | Padovani | 229/1.5 B |
| 3,839,129 | 10/1974 | Neumann | |
| 3,857,754 | 12/1974 | Hirata et al. | |
| 3,975,463 | 8/1976 | Hirata et al. | |
| 4,104,349 | 8/1978 | Hillgenberg | 264/153 |
| 4,239,727 | 12/1980 | Myers et al. | 264/550 |
| 4,410,482 | 10/1983 | Subramanian | 264/515 |
| 4,418,033 | 11/1983 | Hatakeyama | 264/509 |
| 4,444,817 | 4/1984 | Subramanian | 428/36 |
| 4,755,129 | 7/1988 | Baker et al. | 425/292 |

FOREIGN PATENT DOCUMENTS

| | | |
|---|---|---|
| 1031527 | 5/1978 | Canada . |
| 0075816 | 4/1983 | European Pat. Off. . |
| 52-047057 | 4/1977 | Japan . |
| 57-163544 | 10/1982 | Japan . |
| 57-189832 | 11/1982 | Japan . |
| 58-069015 | 4/1983 | Japan . |
| 59-159342 | 9/1984 | Japan ............... 264/269 |
| 60-021244 | 2/1985 | Japan . |
| 60-220717 | 11/1985 | Japan . |
| 472960 | 5/1969 | Switzerland . |
| 1544917 | 4/1979 | United Kingdom . |
| 8805376 | 7/1988 | World Int. Prop. O. . |

Primary Examiner—Jeffery Thurlow
Assistant Examiner—Mathieu Vargot

[57] ABSTRACT

This invention relates to an injection moulding process for the manufacture of multi-layered articles, especially articles having barrier properties. The process includes clamping a thermoplastic film over the cavity of a mould of an injection moulding process, the film being capable of being stretched. The film is then stretched within the mould by inserting the core of the mould, preferably using a core in which a central part enters the mould and partially stretches the film prior to the remainder of the core entering the mould. The mould is then closed, excess film is trimmed off and polymer is injected into the mould cavity. The resultant article is a multi-layered injection moulded article which, depending on the characteristics of the film and injected polymer, may have barrier properties to oxygen, liquids or the like that are superior to articles moulded from only the polymer. The process is particularly useful in the moulding of containers having a depth:width ratio of at least 0.5.

3 Claims, 3 Drawing Sheets

PROCESS FOR THE INJECTION MOULDING OF MULTI-LAYERED ARTICLES

RELATED PATENT APPLICATION

This is a continuation of application Ser. No. 07/603,277, filed Oct. 25, 1990, now abandoned, which is a continuation-in-part of application Ser. No. 07/299,533, filed Jan. 19, 1989, now abandoned.

BACKGROUND OF THE INVENTION

1. Field of the Invention

The present invention relates to an injection moulding process for the manufacture of multi-layered articles, and especially to the manufacture of multi-layered containers having barrier properties.

2. Description of the Prior Art

A wide variety of polymers may be used in injection moulding processes e.g. polyolefins, especially polyethylene, polypropylene and ethylene/vinyl acetate copolymers, polyesters and polyamides. As used herein, polyethylene refers to homopolymers of ethylene and copolymers of ethylene with minor amounts of at least one $C_4$–$C_{10}$ hydrocarbon alpha-olefin.

A particularly important end-use for polyolefins is in the packaging industry, for instance in the injection moulding of polyethylene to form articles, especially containers. Polyethylene used in injection moulding processes may exhibit melt indices in the range of about 0.3 to 120 dg/min, or even higher, depending on the intended end-use of the resultant article and the physical characteristics required in the article. Melt index is inversely related to molecular weight and is measured by the procedure of ASTM D-1238 (Condition E).

Polyolefins exhibit excellent resistance to permeation by water, which may be a useful property in packaging end-uses. However, polyolefins tend to be very permeable to gases and some liquids, especially oxygen and hydrocarbon liquids, and such characteristics may limit the usefulness and acceptability of polyolefins as a packaging material, especially in the packaging of materials, e.g. foodstuffs, susceptible to, for example, the effects of oxygen.

It is well known in the packaging industry to form laminated and co-extruded structures, especially packaging films. Such structures may have a number of layers, and each layer may be intended to impart particular properties to the structure. For example, the structure may contain layers intended to be impermeable to water, oxygen, carbon dioxide, fats and oils and the like. Multi-layer structures in the form of, in particular, film and bottles, and/or processes for the manufacture thereof, are disclosed in U.S. Pat. Nos. 3,857,754 and 3,975,463, both of S. Hirata et al., which issued Dec. 31, 1974 and Aug. 17, 1976 respectively, and in U.S. Pat. Nos. 4,410,482 and 4,444,817, both of P. M. Subramanian, which issued Oct. 18, 1983 and Apr. 24, 1986, respectively.

A process for the manufacture of hollow bodies having a three layer structure is disclosed in published European patent application 0 075 816 of P. Bauer and J. Schmidtchen, published Apr. 6, 1983. The process comprises placing a two-layer laminate in a mould of a blow-moulding process, and then laminating the third layer by means of the parison of the blow moulding process. The two-layer laminate may be, for instance, aluminum foil, copper foil, polyvinyl chloride, polyvinylidene chloride or polyamide laminated to a thermoplastic adhesive e.g. ethylene/acrylic acid copolymer or ethylene/vinyl acetate copolymer. The polymer of the parison is a polyethylene having a density of 0.935–0.965 g/cm$^3$ and a melt index of 0.01–2 dg/min.

Injection moulding processes for the manufacture of articles having labels as an integral part of the article are disclosed in, for example, Canadian Patent 1 031 527 of E. Lind, which issued May 23, 1978 Japanese patent application 60 012 244 of Yuka Goseishi KK, published Feb. 2, 1985 and Japanese patent application 58 069 015 of Yuka Goseishi KK, published Apr. 25, 1983. The manufacture of electrically shielded cabinets by injection moulding a molten polymer into a mould containing a metal foil e.g. aluminum, coated with a hot melt adhesive is disclosed in Japanese patent application 52 047 057 of Hitachi KK, published Apr. 14, 1977. The injection moulding of a substrate layer e.g. polystyrene, with a metallized layer and a protective layer e.g. polyester, is disclosed in U.S. Pat. No. 3,839,129 of H. G. Neumann, which issued Oct. 1, 1974.

SUMMARY OF THE INVENTION

It has now been found that a multi-layered container having at least two layers of polymeric materials, especially in which at least one such layer has barrier properties, may be manufactured in an injection moulding process.

Accordingly, the present invention provides a process for the injection moulding of a multi-layered container using injection moulding apparatus, said container having a depth:width ratio of at least 0.5:1, said apparatus having a mould with a core that is adapted to be inserted into a cavity in a spaced-apart relationship related to the thickness and shape of the container to be moulded, said core having a tip that is comprised of an outer core and a centrally located plunger that is adapted to be moved independently of the outer core, the surfaces of the outer core and of the plunger forming the surface of the core when the core is located within the mould, comprising the steps of:

(a) clamping a self-supporting thermoplastic film over the cavity of the mould, said film being capable of being stretched to conform to the shape of the core that is to be inserted into the mould;

(b) sequentially stretching the film in two stages within the mould using the core, with the plunger preceding the outer core into the mould, such that
 (i) the plunger stretches the thermoplastic film, and
 (ii) the outer core further stretches the film, the plunger retracting into the outer core as the outer core enters the mould, thereby forming the surface of the core in the mould;

(c) closing the mould, film excess to the mould being trimmed off substantially simultaneously therewith;

(d) injecting molten thermoplastic polymer into the mould between the film and the surface of the mould cavity, said polymer being capable of bonding to the film;

(e) allowing the container so moulded to cool to below the heat distortion temperature of the moulded container; and (f) opening the mould and removing the moulded container.

In a preferred embodiment of the process of the present invention, the thermoplastic polymer injected into the mould is a polyolefin, especially a polyethylene.

In another embodiment, the film has different barrier properties to the thermoplastic polymer injected into the mould, and especially is a film having a layer of polyvinylidene chloride.

In a further embodiment, the film is a laminate having a layer of a first polymer selected from the group consisting of polyvinylidene chloride, polyamide, ethylene/vinyl alcohol, polyvinyl alcohol and polyester, interposed between layers of a second polymer selected from the group consisting of hydrocarbon polymers of at least one $C_3$–$C_{10}$ alpha-olefin.

In yet another embodiment, the film is stretched to the shape of the mould cavity by the use of differential gas pressure, including applying a vacuum to the mould cavity side of the film or applying air pressure to the core side of the film.

DETAILED DESCRIPTION OF THE INVENTION

The present invention is directed to an injection moulding process for the forming of a multi-layered article, and will be described with particular reference to the embodiments shown in the drawings in which.

Figure 1:
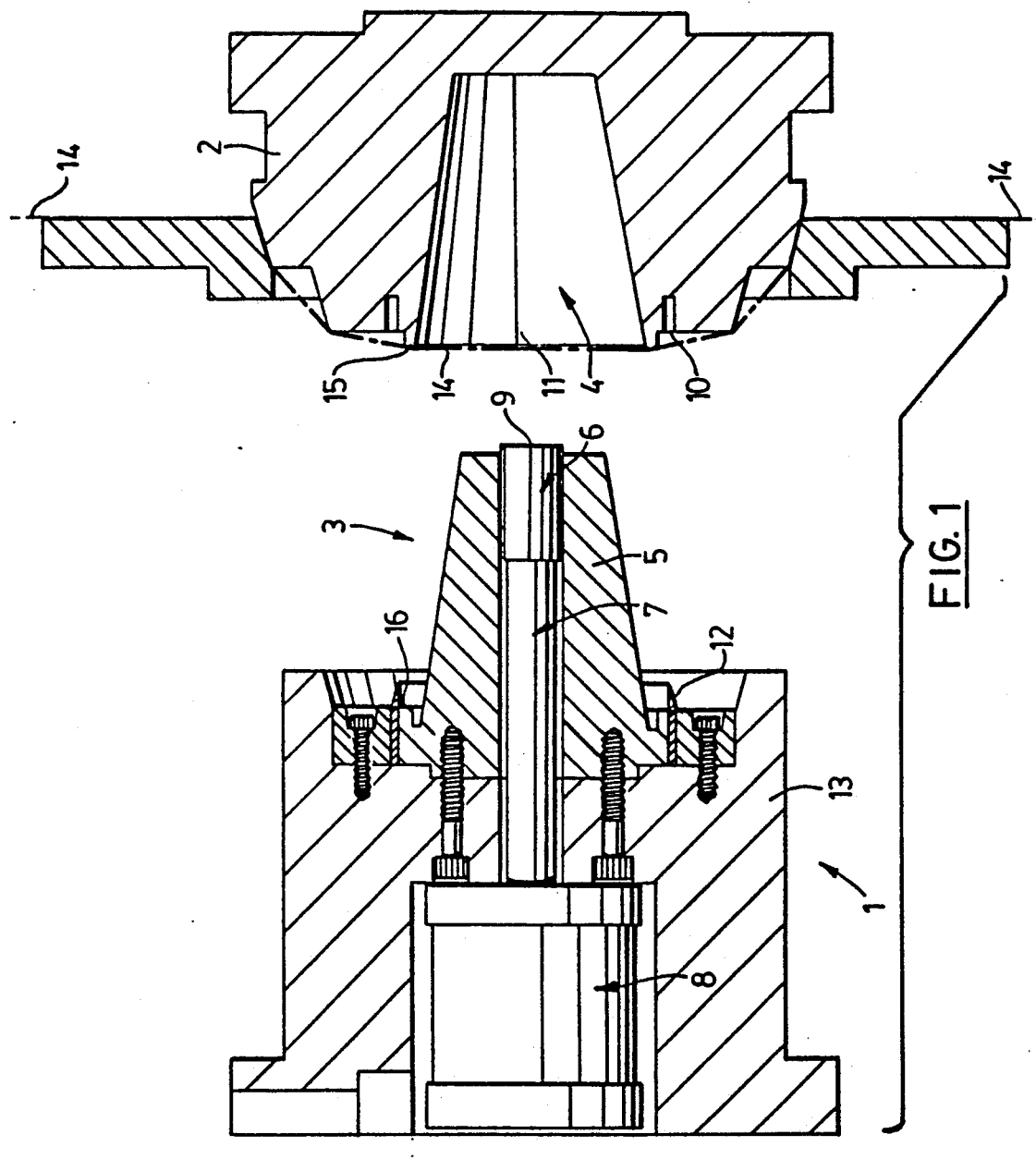
FIG. 1 is a schematic representation of injection moulding apparatus having a film across the cavity of the mould.

Referring to FIG. 1, a mould assembly, generally indicated by 1, is shown to be comprised of mould cavity block 2 and core 3. Mould cavity block 2 is formed from a metal or other suitable material, as is known to those skilled in the art. Mould cavity 4 is recessed in mould cavity block 2 and conforms to the external shape of the container that is to be moulded.

Core 3 is comprised of outer core 5 which has plunger 6 in a channel 7 passing through outer core 5. Plunger 6 is adapted to be moved relative to outer core 5 from the position shown in FIG. 1 to the positions shown in FIGS. 2 and 3, by means of an air cylinder mechanism, indicated by 8. In the position shown in FIG. 1, the surface 9 of plunger 6 may be flush with the corresponding surface of the tip of outer core 5 or it may be other than flush with that surface; however, in the position shown in FIG. 3, discussed in greater detail below, the surface must be flush with the corresponding surface of outer core 5 if the surface of the moulded container is to be smooth. Thus, the tip of core 3 has a centrally-located plunger 6 that is adapted to initially stretch film placed over the mould and an outer core 5 that is adapted to subsequently enter the mould to further stretch the film (see FIG. 2); during this latter stage, plunger 6 is adapted to retract into the outer core to form the surface of core 3 in the mould, it being understood that such retraction would be in relative terms as it would be the outer core 5 that would continue to move.

Mould cavity block 2 has an annular recess 10 adjacent to the mouth 11 of mould cavity 4, which corresponds to cutter blade 12 located in core block 13 adjacent to outer core 5. Cutter blade 12, which may be serrated, is adapted to sever thermoplastic film 14 on closure of the mould. Thermoplastic film 14 is shown stretched over the mouth 11 of mould cavity 4. In addition, on closure of the mould, mould lip 15 abuts with surface 16 adjacent to cutter blade 12, to hold thermoplastic film 14 in place after being severed by cutter blade 12.

Figure 2:
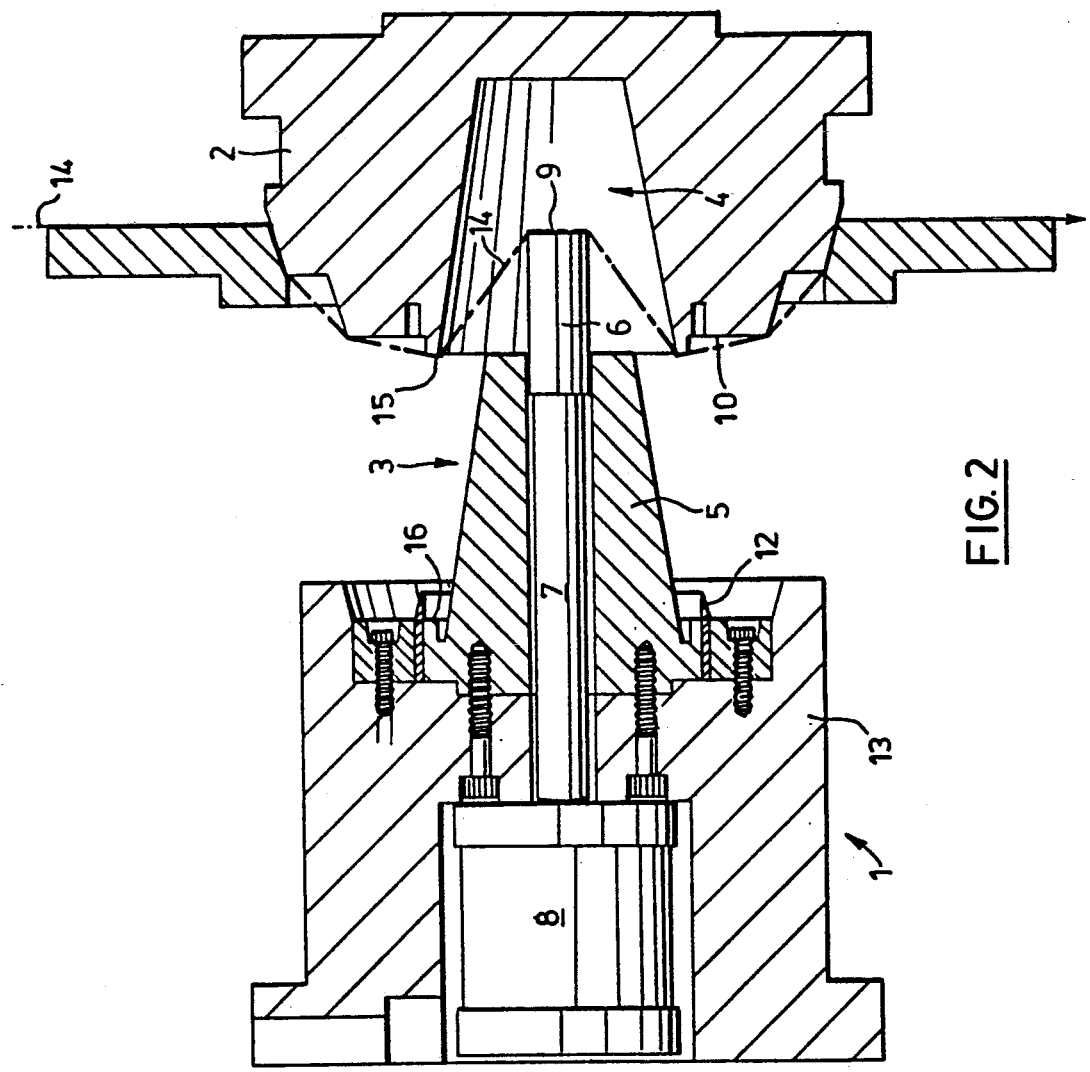
FIG. 2 is a schematic representation of the apparatus of FIG. 1 showing stretching of the film in the mould.

In FIG. 2, the mould is shown in a partially closed position, with core 3 partially inserted into mould cavity 4. In addition, plunger 6 has been extended from core 3, thereby providing an initial stretching of thermoplastic film 14; further stretching of thermoplastic film 14 occurs as outer core 5 of core 3 enters mould cavity 4.

Figure 3:
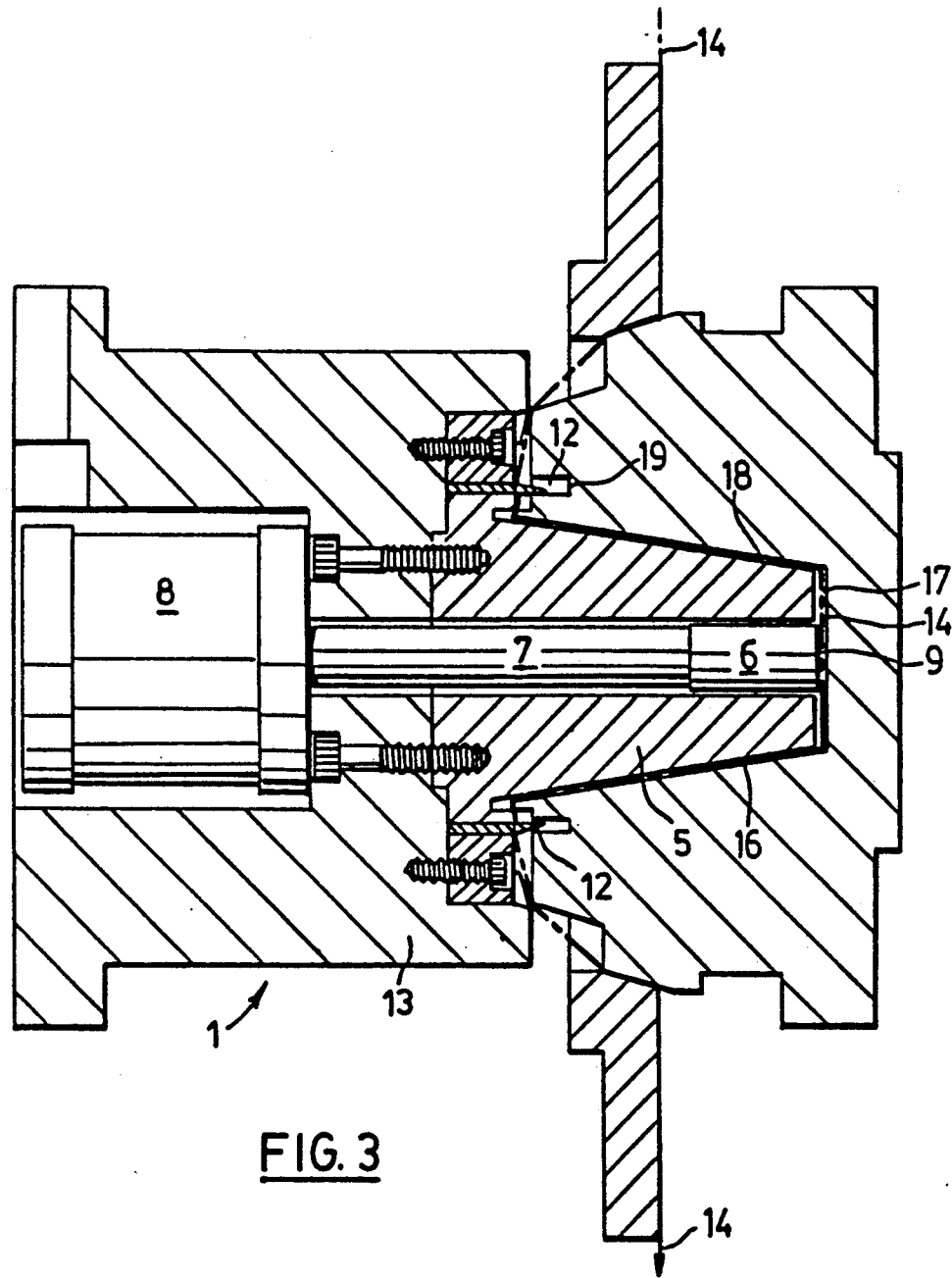
FIG. 3 is a schematic representation of the apparatus of FIG. 1 showing film stretched around the core of the mould.

In FIG. 3, the mould is shown in the closed position. The surface 9 of plunger 6 is shown to be flush with the corresponding surface of outer core 5, thereby forming a smooth surface for the moulding of a container. Plunger 6 and outer core 5 are spaced apart from the surface of mould cavity 2, forming injection cavities 17 and 18. Film 14 is in injection cavities 17 and 18, being stretched around outer core 5 and plunger 6 and juxtaposed thereto. Thus, in the embodiment shown in FIG. 3, film 14 in its stretched condition forms one surface of injection cavities 17 and 18, such surface being the surface that will become the inner surface of the moulded container. Film 14 has been severed by cutter blade 12, which has entered recess 19 in mould cavity block 2.

In operation, the mould is opened and a piece of film is placed over mould cavity 4 so as to cover all of mould cavity 4 and extend beyond mould cavity lip 15. The thermoplastic film 14 may be in the form of a sheet that is of a convenient size or, alternatively, in the form of a roll of film which is pulled by means not shown so as to position film 14 in the desired location over mould cavity 4; the film is "self-supporting" i.e. the film is used without a backing sheet or other support means over the mould cavity, as is shown in the Figures. The mould is then closed. In such closing, plunger 6 enters mould cavity 4 prior to outer core 5, it being understood that both plunger 6 and outer core 5 may enter mould cavity 4 simultaneously, but with plunger 6 preceding outer core 5. Plunger 6 enters mould cavity 4 in such a manner so as to provide an initial stretching of film 14, and thereby reduce the likelihood of the formation of wrinkles or other physical imperfections in the stretched film, which in the embodiment shown in the Figures will form the inner surface of the container. It is believed that the plunger spreads the stretching of the film over a larger area than might be achieved through use of the core alone, with a consequent decrease in the likelihood that uneven stretching of the film will occur. Uneven stretching would lead to thin spots in the film i.e. areas of excessive stretching which, if the film was intended to provide barrier properties, could lead to significant loss of the barrier properties. Heatinq of the film, especially immediately prior to insertion of the film into the mould, may facilitate more uniform stretching of the film in the mould.

Notwithstanding the above, it is believed that the film does not readily stretch in the region of the tip of the plunger. This is advantageous in that the gate of the mould (not shown in the drawings) is usually opposite the location of the plunger and the extra thickness of the film due to reduced or absence of stretching may reduce adverse effects resulting from injection of the stream of molten polymer against the film during the moulding process.

As the mould closes, film 14 is severed by cutter blade 12 to the size required for the container, such severing of film 14 being such that trimming of film from the moulded container would normally not be required in a post-moulding operation. In addition, the closing of the mould also clamps film 14, now in a stretched condition, in the mould.

After the mould has closed, molten polymer is injected into injection cavities 17 and 18 by means not shown but which will be understood by those skilled in the art. The core of the mould is relatively cool, which tends to protect the film from any effects e.g. distortion, of contact of the film with the molten polymer. The thus moulded container is allowed to cool in the mould for a period of time, usually by passing a cooling liquid through channels (not shown) in mould cavity block 2. The cooled moulded container is removed from the mould by opening the mould when the temperature of the moulded container has been reduced below that at which distortion of the moulded container may occur. Such temperature depends on the polymer composition used in the injection moulding of the container, and will be understood by those skilled in the art.

In an alternative embodiment, the process is carried out so that in the resultant moulded container the film is on the outside of the container, rather than on the inside of the container as described above. Such an embodiment may be advantageous, especially in those instances in which the barrier layer is sensitive to moisture and the material to be packaged is an aqueous liquid and/or the outer layer of the film is of a polymer that is more readily printed, dyed, painted or the like, or in which certain additives e.g. antistatic agents may be incorporated. In this embodiment the film is placed in the mould and then stretched so that the film is in contact with the surface of the mould cavity and not the core. This may be achieved by applying a vacuum between the film and the mould cavity surface e.g. through the mould, or by applying pressure e.g. air pressure on the opposite side of the film. The core used may be as described above or it may be a unified core in which the outer core and the plunger are, or are operated as, a single unit.

A wide variety of polymers may be used in the process of the present invention. It is, however, important that the polymer injected in molten condition into the injection cavities be capable of forming an acceptably strong bond with the polymer of the film that is also in the cavity. Failure to develop such a bond will likely result in delamination of the film from the moulded container, thereby resulting in loss of the properties achieved by manufacturing the container using the process of the present invention but also resulting in a container that is aesthetically unacceptable.

Examples of the polymers that may be injected into the mould include polyolefins e.g. polyethylene (which is understood to include homopolymers of ethylene and copolymers of ethylene and at least one $C_4$–$C_{10}$ hydrocarbon alpha-olefin), polypropylene and other homopolymers and copolymers of hydrocarbon alpha-olefins, especially $C_3$–$C_{10}$ alpha-olefins, ethylene/vinyl acetate copolymers, ionomers, copolymers of ethylene and ethylenically unsaturated carboxylic acids and derivatives thereof, polyamides, polyesters, polystyrene and the like. Grafted and other modified polymers may also be used. Such polymers may contain stabilizers and other additives, foaming agents, cross-linking agents, fillers, pigments and the like.

The thermoplastic polymer film may be a film of a single polymer, in which event it would presumably be of a polymer different from that injected into the mould or of the same polymer that has different polymer characteristics e.g. different molecular weight, additives or the like. In particular, the film could exhibit different barrier characteristics to the polymer injected into the mould and/or different surface, colour or other characteristic. Alternatively, the film may be a laminated or coated film, in which the polymer of the surface that comes into contact with the molten polymer is formed from a polymer capable of bonding to the molten polymer but in which other layers of the film may be of different characteristics. It is understood that one or more layers may have to be impermeable to moisture if an internal layer of the film is sensitive to moisture. For example, the permeability or barrier characteristics of some polymers e.g. polyvinyl alcohol, depend to a significant extent on the moisture content of the polymer.

Examples of barrier layers in films for use in the process of the present invention, especially where the barrier layer is a barrier to oxygen and other gases, include polyvinylidene chloride (PVDC), polyvinyl alcohol (PVOH), ethylene/vinyl alcohol copolymers (EVOH), acrylonitrile and polycarbonate.

The interface layer of the film viz. that part of the film that will be contacted with the injected polymer, must be compatible with the injected polymer, especially with respect to the forming of a bond of adequate strength for the intended end-use of the moulded article. The interface layer may be the barrier layer or may be a layer of a laminated film, the barrier layer being other than the interface layer. The polymer of the interface layer may be the same as that injected into the mould or may be different, provided that a bond of adequate strength is formed during the moulding process.

Examples of films that may be used in the process of the present invention include PVDC-coated polyethylene, laminates of polyethylene/PVDC or PVOH or EVOH/polyethylene, laminates of polyethylene/PVDC or PVOH or EVOH/ethylene-vinyl acetate copolymer, laminates of polyamide or polyester to polyethylene, and the like. In each instance the combination of film and injected polymer would be selected so that an acceptable bond is formed. Moreover, the film is selected so that it is sufficiently flexible to stretch in the moulding process and form a wrinkle- and fold-free film juxtaposed to the outer core and plunger (or mould cavity block) of the mould.

The film may be manufactured using coextrusion techniques and/or using lamination techniques, or other techniques understood by those skilled in the art. In addition to layers described above, the film may have additional layers of adhesives or other bonding agents in order to obtain a film with a sufficient degree of integrity for the intended use.

The film may be used in an unoriented condition i.e. as manufactured. Alternatively, the film may be uniaxially or biaxially oriented; such oriented film must be only partially oriented and be capable of being stretched i.e. further orientation, during the moulding process. Use of oriented films may result in injection moulded articles of superior properties e.g. improved toughness, which could result in increased impact resistance or for example the formation of hinged sections if moulds of an appropriate shape were used. Alternatively, the film may have a highly conductive layer, while retaining flexibility, to provide protection for the contents of the moulded container against electro-static and/or magnetic induction discharge. In all instances, the film must be capable of being stretched within the mould.

The present invention may be used in the injection moulding of containers having barrier properties i.e. properties in which the permeability of the film and injected polymer to a particular gas or liquid e.g. oxygen, hydrocarbon fluids, fats, oils, water and the like is different, so that the container exhibits decreased permeability to such gas or liquid. Such containers may be used in the packaging of moisture or oxygen sensitive foods or products. The containers manufactured by the process of the invention should have a depth:width ratio of at least 0.5:1, and in preferred embodiments a depth:width ratio of at least 0.75:1 and in particular at least 0.9:1.

The present invention is illustrated by the following examples.

EXAMPLE I

A three-layer film viz. of polyethylene/PVDC-/polyethylene, was placed over the cavity of a mould for the moulding of coffee cups and held in place. The film was stretched as the mould was closed and then molten Sclair ® 2915 ethylene homopolymer, having a density of 0.959 g/cm$^3$ and a melt index of 65 dg/min, was injected into the mould. Coffee cups having a wall thickness of 0.5 mm were obtained, which after trimming of some excess film from around the lip of the cup were physically indistinguishable from similar cups moulded without use of the film.

EXAMPLE II

Using a dummy mould not adapted for injection of molten polymer, it was demonstrated that the film of Example I could be stretched in the two-stage stretching method described above using a plunger and outer core. In addition, use of a serrated cutter blade in the manner described above to trim off the film around the mould was also demonstrated.

EXAMPLE III

In a comparison test, containers having a height of 7.5 cm, a width at the top (excluding lip) of 7.5 cm and a width at the bottom of 5 cm, were injection moulded, without the use or stretching of a film, on an Engel injection moulding apparatus. The polymer was Sclair ® 2915 ethylene homopolymer which has a density of 0.959 g/cm$^3$ and a melt index of 65 dg/min. The melt temperature of the polymer injected into the mould of the injection moulding apparatus was 260° C.; the core of the mould had a temperature of 120° C. and the cavity portion of the mould had a temperature of 90° C. The cycle time used was 10 seconds (including 4 seconds inject and hold, and 4 seconds cooling). The containers obtained had a wall thickness of 0.5–0.75 mm.

Oxygen permeability of the containers was then measured. The results obtained, averaged for duplicate samples, are given in Table I.

EXAMPLE IV

The procedure of Example III was repeated, except that a 110 micron film of polyethylene/PVDC (4 microns)/polyethylene was placed over the mould, so that containers were manufactured according to the present invention.

The results of the measurement of oxygen permeability are given in Table I.

EXAMPLE V

The procedure of Example IV was repeated, except that the polymer injected into the mould was Sclair ® 2914 ethylene homopolymer which has a density of 0.960 g/c$^3$ and a melt index of 50 dg/min; the resultant containers would have improved toughness properties.

The results of the measurement of oxygen permeability are given in Table I.

EXAMPLE VI

The procedure of Example V was repeated using a coextruded film of polyethylene/EVOH as the film. The moulded containers had the EVOH sandwiched between the layers of ethylene polymer.

The results of measurement of oxygen permeablity are given in Table I.

TABLE I

| Example | Sample Construction* | Oxygen Permeability** |
|---|---|---|
| III | PE | 0.86 |
| IV | PE + PE/PVDC/PE | 0.29 |
| V | PE + PE/PVDC/PE | 0.32 |
| VI | PE + PE/EVOH/PE | 0.06 |

*PE = polyethylene (ethylene polymer) as defined in Examples III–IV
**measured as cc O$_2$/day for the container Examples III to VI illustrate a comparative process and the process of the invention, including the manufacture of containers having barrier properties.

We claim:

1. A process for the injection moulding of a multi-layered container having barrier properties using injection moulding apparatus, said container having a depth:-width ratio of at least 0.75:1, said apparatus having a mould block with a core that is adapted to be inserted into a cavity of the mould block in a spaced-apart relationship related to the thickness and shape of the container to be moulded, said core having a tip that is comprised of an outer core and a centrally located plunger that moves independently of the outer core, the surfaces of the outer core and of the plunger forming the surface of the core when the core is located within the mould block, comprising the steps of:
   (a) clamping a self-supporting thermoplastic film over the cavity of the mould block said film being selected from (1) PVDC-coated polyethylene, (2) laminates of polyethylene/PVDC/polyethylene, (3) laminates of polyethylene/ethylene-vinyl alcohol/polyethylene, (4) laminates of polyethylene/polyvinyl alcohol/polyethylene, (5) laminates of polyethylene/PVDC/ethylene-vinyl acetate copolymer, (6) laminates of polyethylene/-polyvinyl alcohol/ethylene-vinyl acetate copolymer, and (7) laminates of polyethylene/ethylene-vinyl alcohol/ethylene-vinyl acetate copolymer and further being capable of being stretched to conform to the shape of the core that is to be inserted into the mould block.
   (b) substantially uniformly stretching the film by sequentially stretching the film in two stages within the mould block using the core, with the plunger preceding the outer core into the mould block, such that (i) the plunger stretches the thermoplastic film, and (ii) the outer core further stretches the film, the plunger retracting into the outer core as the outer core enters the cavity of the mould block, thereby forming the surface of the core in the mould block;

(c) closing the mould block and core, with excess film, being trimmed off substantially simultaneously therewith using a serrated blade, the serrated blade located on the core and entering a recess in the mold block upon closure;

(d) injecting molten thermoplastic polyolefin into the mould between the film and the surface of the mould cavity, said polyolefin being bonded to the film such that the container is formed with polyolefin on its outer surface thereof and the polyethylene of the film on its inner surface thereof;

(e) allowing the container so moulded to cool to below the heat distortion temperature of the moulded container; and (f) opening the mould block and core and removing the moulded container; said film having different barrier properties than the thermoplastic polyolefin with respect to at least one of oxygen, hydrocarbon liquids, and water.

2. The process of claim 1 in which the polyolefin is polyethylene.

3. The process of claim 2 in which the container has a ratio of depth:width of at least 0.90:1.

* * * * *